United States Patent [19]

Lam et al.

[11] Patent Number: 5,373,526
[45] Date of Patent: Dec. 13, 1994

[54] APPARATUS AND METHOD FOR OPTICAL ENERGY AMPLIFICATION USING TWO-BEAM COUPLING

[75] Inventors: Juan F. Lam, Agoura Hills; Huan-Wun Yen, Westlake Village; Joseph L. Pikulski, Westlake, all of Calif.

[73] Assignee: Hughes Aircraft Company, Los Angeles, Calif.

[21] Appl. No.: 881,951

[22] Filed: May 12, 1992

[51] Int. Cl.$^5$ .............................................. H01S 3/09
[52] U.S. Cl. .......................................... 372/69; 372/6; 372/22; 372/13; 372/64; 372/39; 372/102; 372/28; 385/115
[58] Field of Search ...................... 372/39, 102, 6, 21, 372/69, 13, 26, 93, 28, 22, 64; 385/115

[56] References Cited

U.S. PATENT DOCUMENTS

| | | | |
|---|---|---|---|
| 4,761,059 | 8/1988 | Yeh et al. | 372/21 |
| 5,050,175 | 9/1991 | Ayral et al. | |
| 5,121,400 | 6/1992 | Verdiell et al. | |

FOREIGN PATENT DOCUMENTS

| | | |
|---|---|---|
| 107840 | 10/1983 | European Pat. Off. |
| 353870 | 6/1989 | European Pat. Off. |
| 0403340 | 12/1990 | European Pat. Off. |
| 0436411 | 7/1991 | European Pat. Off. |
| 253856 | 6/1982 | France |
| 119508 | 5/1987 | Japan |

OTHER PUBLICATIONS

"Phase conjugate master oscillator-power amplifier using BaTiO$_3$ and AlGaAs semiconductor diode lasers", Applied Phys. Ltrs., vol. 50, pp. 647–649 (1987), Stephens et al.

"Coherent addition of AlGaAs lasers using microlasers and diffractive coupling", Applied Phys. Ltrs., vol. 52, pp. 1771–1773, (1988), Ledger et al.

"Coherent coupling of independent grading-surface-emitting diode laser array using an external prism", Appl. Phys. Ltrs., vol. 56, pp. 114–116 (1990), Carlson et al.

"Fabrication of a two-dimensional phased array of vertical-cavity surface-emitting lasers", Appl. Phys. Ltrs., vol. 56, p. 1198, (1990), Yoo et al.

"FM response of narrow-linewidth multielectrode λ/4 shift DFB laser", Photonics Technology Ltrs., vol. 2, p. 165, (1990), Ogita et al.

Berman et al., Spectral Line Shapes, vol. 3, F. Rostos et al., published by DeGruyter of Berlin, pp. 337–339 (1985).

"Low noise erbium-doped fiber amplifier operating at 1.54 μm", Electronics Ltrs., vol. 23, pp. 1026–1028, (1987), Mears et al.

"Gain Saturation Effects in High-Speed, Multichannel Erbium-Doped Fiber Amplifiers at λ=1.53 μm", Journal of Lightwave Technology, vol. 7, No. 12, Dec. 1989, pp. 2045–2104, Desurvire et al.

(List continued on next page.)

Primary Examiner—Léon Scott, Jr.
Attorney, Agent, or Firm—Vijayalakshmi D. Duraisamy; W. K. Denson-Low

[57] ABSTRACT

A diffraction limited working beam at a given frequency is amplified without degrading its diffraction limited quality by diverting a minor portion of the beam as a probe beam, and amplifying the remaining portion of the working beam with a high power pump beam at a different wavelength. The amplification takes place in a host medium that has a rare earth dopant with an energy transition from the pump beam's wavelength to the wavelength of the working beam. The resulting amplified working beam is non-diffraction limited. The probe beam is frequency modulated and coupled with the amplified working beam in a second host medium that also has a rare earth dopant. Energy is transferred from the amplified working beam to the modulated probe beam through a resonant energy transfer in the second host medium, producing an amplified output beam at the working beam frequency that retains the diffraction limited quality of the probe beam.

29 Claims, 7 Drawing Sheets

OTHER PUBLICATIONS

"Erbium Doped Fibers for Efficient Optical Amplifiers", *IEEE Proceedings*, vol. 137, Pt. J., No. 4, Aug. 1990, pp. 205208, Ainslie et al.

"Erbium-Doped Fiber Amplifier with Flattened Gain Spectrum", *IEEE Photonics Ltrs.*, vol. 3, No. 2, Feb. 1991, pp. 118-120, Tachibana et al.

"A 970 nm strained-layer SnGaAs/GaAlAs quantum well laser for pumping an erbium-doped optical fiber amplifier", *Appl. Phys. Ltrs.*, vol. 56, pp. 221-223 (1990), Wu et al.

"Strained-layer ZnGaAs/AsAs/AlGaAs single quantum well lasers with high internal quantum efficiency", Appl. Phys. Ltrs., vol. 55, pp. 22682270, (1989), Larson et al.

"980 nm diode laser for pumping $Er^{3+}$÷doped fiber amplifiers", *Photonics Technology Ltrs.*, vol. 2, pp. 153-155 (1990), Bour et al.

"Diffraction-limited operation from monolithically integrated diode laser array and self-imaging (Talbot) cavity", *Appl. Phys. Ltrs.*, 55(19), Nov. 6, 1989, pp. 1949-1951, M. Jansen et al.

"Binary-optics miniature Talbot cavities for laser beam addition", *Appl. Phys. Ltrs.*, 56(1), Jan. 1, 1990, p. 46, J. R. Leger et al.

Applied Physics Letters, vol. 34, No. 7, Apr. 1, 1979, New York, pp. 463-464, A. Tomita, "Phase Conjugation Using Gain Saturation of a Nd:YAG Laser".

Physical Review, B. Condensed Matter, vol. 45, No. 13, Apr. 1, 1992, New York, pp. 7077-7083, M. Broer et al., "Photoinduced refractive-index changes in several $Eu^{3+}$-, $Pr^{3+}$-, and $Er^{3+}$-doped oxides glasses".

APPARATUS AND METHOD FOR OPTICAL ENERGY AMPLIFICATION USING TWO-BEAM COUPLING

BACKGROUND OF THE INVENTION

1. Field of the Invention

This invention relates to the amplification of optical beams using two-beam coupling, and more particularly optical amplification capable of producing a near diffraction limited output.

2. Description of the Related Art

Several techniques are currently available for extracting a near diffraction limited optical beam from an array of diode amplifiers. A diffracted limited beam is one with minimum dispersion and a generally planar wave front. The techniques are:

(1) Non-linear optical phase conjugation, in which an input beam is routed through an array of semiconductor amplifiers, phase conjugated, and then returned through the same semiconductor amplifiers for further amplification. This technique is disclosed in Stephens et al., "Phase conjugate master oscillator-power amplifier using BaTiO3 and AlGaAs semiconductor diode lasers", *Applied Physics Letters*, Vol. 50, pages 647-649 (1987).

(2) Self-imaging or Talbot cavities, as disclosed in Ledger et al., "Coherent addition of AlGaAs lasers using microlasers and diffractive coupling", *Applied Physics Letters*, Vol. 52, pages 1771-1773 (1988).

(3) The use of external prisms, as described in Carlson et al., "Coherent coupling of independent grading-surface-emitting diode laser array using an external prism", *Applied Physics Letters*, Vol. 56, pages 114-116 (1990).

(4) The microfabrication of vertical cavities, as described in Yoo et al., "Fabrication of a two-dimensional phased array of vertical-cavity surface emitting lasers", *Applied Physics Letters*, Vol. 56, page 1198 (1990).

However, each of the above techniques suffer from various limitations. These include thermal loading due to the high injection current required to operate the system, a difficulty in the practical implementation of a high modulation rate required for optical communications unless external modulators are used, and an inability to achieve a true diffraction limited optical beam with a high average power.

No high power optical beam sources are currently available for certain wavelengths. For example, 1.55 microns is used for satellite communications and fiber optic systems, but a high power laser at this wavelength has not been developed. Distributed feedback semiconductor lasers have recently been developed that oscillate at 1.55 microns and are capable of tens of gigahertz modulation, with a flat FM response from 100 kHz to 15 GHz, Ogita et al., "FM response of narrow-linewidth multielectrode λ/4 shift DFB laser", *Photonics Technology Letters*, Vol. 2, page 165 (1990). While this type of laser is capable of high modulation rates and generates a near diffraction limited beam, it is restricted to low power levels.

An optical energy transfer system that uses resonant-two-beam coupling and can be used to amplify one beam at the expense of another beam has been discovered, and is described in Berman et al., *Spectral Line Shapes*, Vol. 3, F. Rostos ed., published by De Gruyter of Berlin, pages 337-339 (1985). While this technique has been shown to be capable of producing efficient energy transfers between two input beams in sodium vapor. It is not applicable to the high power amplification of beams at frequencies such as 1.55 microns. Two-beam coupling in a photorefractive material such as BaTiO3 has also been demonstrated, patent No. 4,761,059, issued Aug. 2, 1988 to Yeh et al. However, a coupling medium like BaTiO3 has a very slow response time, on the order of seconds, and can therefore be used only for essentially continuous wave applications. Due to the intrinsic limitation of BaTiO3, high power operation cannot be achieved.

A transfer of energy between beams of different wavelengths has been achieved by coupling beams within a host medium that has a rare earth dopant with an energy transition between the wavelengths of the two beams. This type of optical energy transfer mechanism has been demonstrated to have a high gain (30 dB) in the 1.5 micron regions Mears et al., "Low noise erbium-doped fiber amplifier operating at 1.54 μm", *Electronics Letters*, Vol. 23, pages 1026-1028 (1987). Its application to erbium-doped optical fiber amplifiers is discussed in Desurvire et al., "Gain Saturation Effects in High-Speed, Multichannel Erbium-Doped Fiber Amplifiers at λ=1.53 μm", *Journal of Lightwave Technology*, Vol. 7, No. 12, December 1989, pages 2045-2104; Ainslie et al., "Erbium Doped Fibers For Efficient Optical Amplifiers", *IEEE Proceedings*, Vol. 137, Pt. J, No. 4, August 1990, pages 205-208; and Tachibana et al., "Erbium-Doped Fiber Amplifier With Flattened Gain Spectrum", *IEEE Photonics Technology Letters*, Vol. 3, No. 2, February 1991, pages 118-120.

While this technique is capable of achieving high modulation rates in the 10 GHz regime and a relatively flat optical gain response, it does not preserve the diffraction limited quality of an input beam to which energy is transferred. Rather, an input beam that is originally diffraction limited will be distorted to a non-diffraction limited beam during the amplification process.

SUMMARY OF THE INVENTION

The present invention seeks to provide a system and method for amplifying an optical beam at a wavelength such as 1.55 microns that does not suffer from the thermal loading associated with the use of an injection current, is capable of high modulation rates, and is capable of producing a high average power, diffraction limited optical output through an energy transfer from a high power optical source at a different wavelength.

To accomplish these desired results, a working beam at a desired output wavelength is coupled with a pump beam at a different wavelength in a first host medium that has a rare earth dopant with an energy transition from the pump beam's wavelength to the wavelength of the working beam. This produces an energy transfer from the pump beam that amplifies the working beam. Prior to coupling with the pump beam, a portion of the working beam is diverted for use as a probe beam. When the original working beam is diffraction limited, the diverted probe beam remains diffraction limited while the amplified portion of the working beam loses its diffraction limited quality during amplification by the pump beam.

The probe beam is frequency modulated, followed by coupling it together with the amplified working beam into a second host medium that also has a rare earth dopant. The two beams beat against each other in the second host medium, producing gratings that result in a resonant energy transfer from the amplified working beam to the probe beam. Although the amplified working beam is non-diffraction limited, the resonant energy transfer preserves the diffraction limited quality of the probe beam. Through this two-step amplification process, first from the pump to the working beam and then from the working to the probe beam, a diffraction limited output beam with a high average power is produced at the original working beam wavelength.

The first host medium within which the energy transfer from the pump to the working beam takes place is preferably implemented as a plurality of optical fibers. In one embodiment the areas of the fiber cores are expanded at their input ends, while cladding layers around the fiber cores are reduced in thickness near their output ends so that the fiber outputs can be arranged in close proximity to each other. With the input ends of the optical fibers arranged in an m×m array, the working and pump beams can be coupled into the fibers by means of a pair of 1×m mutually orthogonal binary phase gratings that divide the working and pump beams into a combined m×m array aligned with the fiber inputs.

In another embodiment the fibers are merged at their input ends and separated in a spaced array at their outputs. The input areas of the fibers can be reduced, with a coupling fiber that is single mode with respect to the working beam used to transmit the working and pump beams into the fiber array. Both the input and output ends of the coupling fiber are preferably enlarged for this purpose. Alternately, the working beam can be coupled into the amplifying fibers through at least one single mode coupling fiber, with the pump beam coupled into the amplifying fibers through a greater number of single mode coupling fibers than those used for the working beam.

These and other features and advantages of the invention will be apparent to those skilled in the art, taken together with the accompanying drawings, in which:

DETAILED DESCRIPTION OF THE INVENTION

Figure 1:
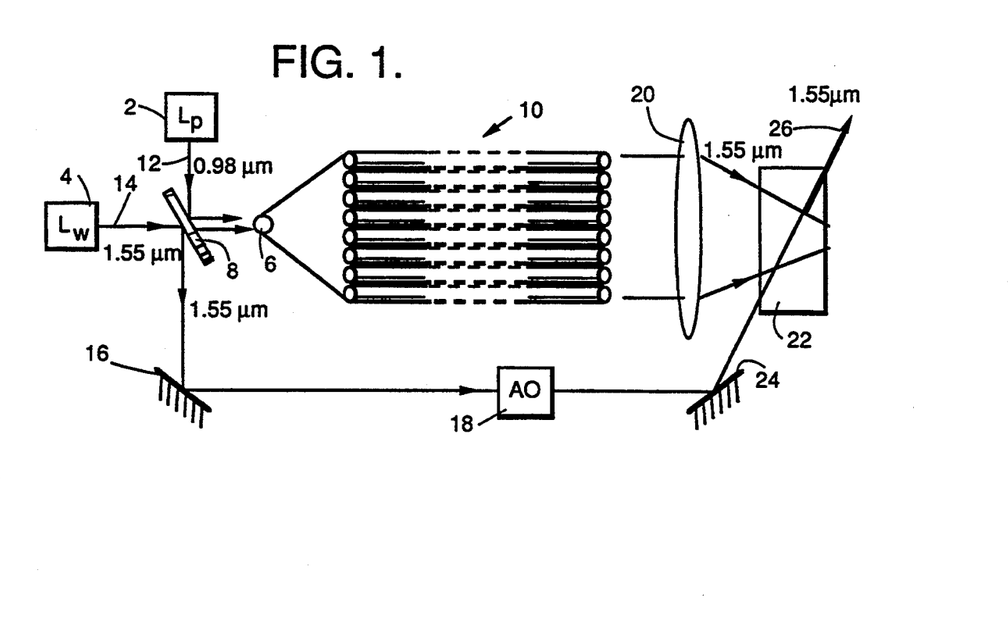
FIGS. 1 and 2 are block diagrams of the present optical amplification system employing optical fibers and a waveguide, respectively, for transferring energy between pump and working beams that have different wavelengths.

A first embodiment of the invention that employs an array of optical fibers to transfer energy between a pump and working beams that have different wavelengths is illustrated in FIG. 1. While beams with many different wavelengths could be selected, for purposes of illustration a pump beam with a wavelength of 0.98 microns and a working beam with a wavelength of 1.55 microns will be assumed. This is because 1.55 microns is a desirable wavelength for satellite and fiber optic communications but high power 1.55 microns lasers are not currently available, while high power GaAs lasers at 0.98 microns have previously been developed.

The outputs of a 0.98 micron semiconductor laser 2 and a 1.55 micron semiconductor laser 4 are directed onto a coupling element 6 through a beam splitter 8. Lasers for each wavelength are currently available. A 0.97 micron semiconductor laser was demonstrated in Wu et al., "A 970 nm strained-layer ZnGaAs/GaAlAs quantum well laser for pumping an erbium-doped optical fiber amplifier", *Applied Physics Letters*, Vol. 56, pages 221-223 (1990), using strained layer InGaAs/-GaAlAs quantum wells as the gain medium. The laser had a power output as high as 20 mW, a threshold current as low as 20 mA, and an external quantum efficiency of 0.28 mW/mA per facet. In Larsson et al., "Strained-layer ZnGaAs/AsAs/AlGaAs single quantum well lasers with high internal quantum efficiency", *Applied Physics Letters*, Vol. 55, pages 2268-2270 (1989), a strained layer InGaAs/GaAs/AlGaAs laser using a single quantum well was demonstrated. A threshold current of 100 mA in a cavity length of 300 microns, and a lasing wavelength between 0.97 and 0.98 microns, were measured; wavelength tunability from 0.965 through 0.985 as a function of cavity length was shown. In Bour et al., "980 nm diode laser for pumping ER$^{3+}$-doped fiber amplifiers" *Photonics Technology Letters*, Vol. 2, pages 153-155 (1990), an InGaAs/AlGaAs single quantum well laser with an oscillation wavelength of 0.98 microns was shown with a very low threshold current (8 mA) and a high continuous wave output power on the order of 125mW. To generate the working beam, laser 4 may be implemented as a distributed feedback semiconductor oscillating at 1.55 microns.

The outputs of the coherent laser beam sources 2 and 4 are coupled through coupling element 6 into an array of optical fibers 10, within which energy is transferred from the pump beam 12 to the working beam 14. For this purpose the fibers are preferably glass, single mode with respect to the working beam wavelength, and doped with a rare earth dopant that has an energy transition from the wavelength of the pump beam to that of the working beam. Erbium has been found to be a suitable dopant for transferring energy from a 0.98 micron to a 1.55 micron beam. The invention is also applicable to beams at other wavelengths. For example, with a 1.3 micron working beam (a useful wavelength for relatively short range, dispersion free communications such as local area networks and cable television), praseodymium is a suitable dopant.

The beam splitter 8 diverts a small portion of the working beam 14 and directs it via mirror 16 along an optical path that includes an acousto-optic modulator or frequency modulation quency shifter 18. This device imposes a frequency modulation upon the probe beam without substantially affecting its near diffraction limited quality. Acousto-optic modulators are known which operate by applying a mechanical. pressure to a crystal to generate sound waves that change the crystal's index of refraction, and thus shift the beam frequency. Modulating the pressure applied to the crystal in a repeating pattern will modulate the frequency/wavelength of the probe beam in a similar fashion.

The dopant concentration in the amplifying fibers 10 is preferably $1-2\times 10^{19}$ cm$^{-3}$. Dopant concentrations that substantially exceed this range and tend to quench the radiation, or that are substantially below this range and are insufficient to transfer power between the pump and working beams, are less desirable.

The output from the fibers 10 is focused by a lens 20 into a glass or crystal host medium 22 that has a rare earth dopant, such as erbium for the 1.55 micron amplified output of fibers 10 in the present example. The fiber output is focused rather than imaged into the host medium 22 so that it extends over a smaller volume therein.

The modulated probe beam is directed into the host medium 22 by a mirror 24, and optically couples within medium 22 with the focused working beam. The two beams undergo a nonlinear optical interaction within the host medium 22 by which energy is transferred from the 1.55 micron amplified working beam to the modulated 1.55 micron probe beam. This interaction involves the generation of traveling wave gratings by interference between the probe and amplified working beams, the coherent scattering of the amplified working beam from the gratings that result from beating the two beams together, and a consequent transfer of energy from the stronger working beam to the weaker frequency modulated probe beam. The process is a resonant energy transfer such as those described previously.

If the original working beam 14 generated by laser 4 is of good optical quality and diffraction limited, the diverted probe beam will have a similar good optical quality. Even though the major portion of the working beam suffers a loss of optical quality during its amplification by the pump beam 12, the probe beam retains its good optical quality during the resonant energy transfer from the amplified working beam. Thus, a high power, diffraction limited 1.55 micron output beam 26 is obtained from the host medium 22 despite the lack of a good high power 1.55 micron laser source.

Figure 2:
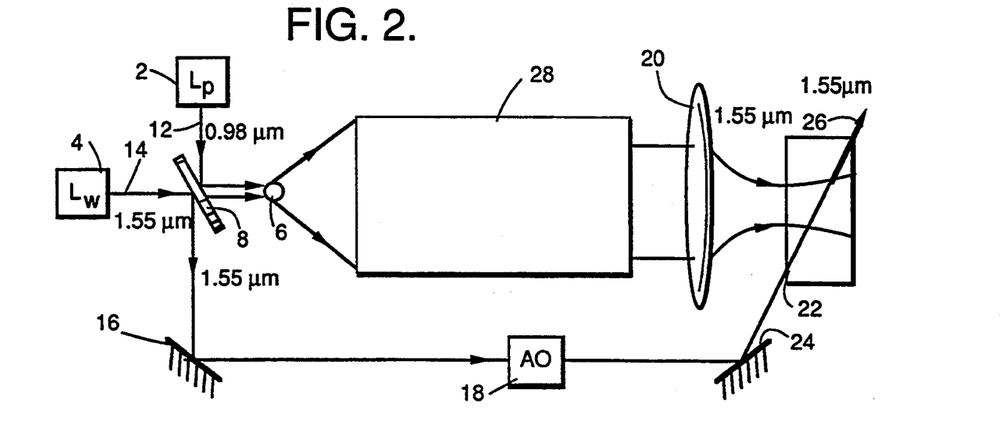

An alternate embodiment is shown in FIG. 2 that uses a rare earth doped rectangular waveguide amplifier 28 in place of the optical fibers 10 of FIG. 1; other elements of the FIG. 2 system that are the same as in FIG. 1 are indicated by the same reference numerals. The waveguide 22 has a larger cross-sectional area than any single one of the optical fibers 10, and thus does not establish a single-mode propagation of the working beam.

The choice of the particular host medium used for the cores of the optical fibers 10 or waveguide 28, and for the resonant energy transfer medium 22, will determine the wavelength and bandwidth of the peak energy transfer. In general any glass or crystal can be used, although silicon oxides are preferred for communications applications. Erbium does not change its properties in a crystalline host for different host media.

Figure 3:
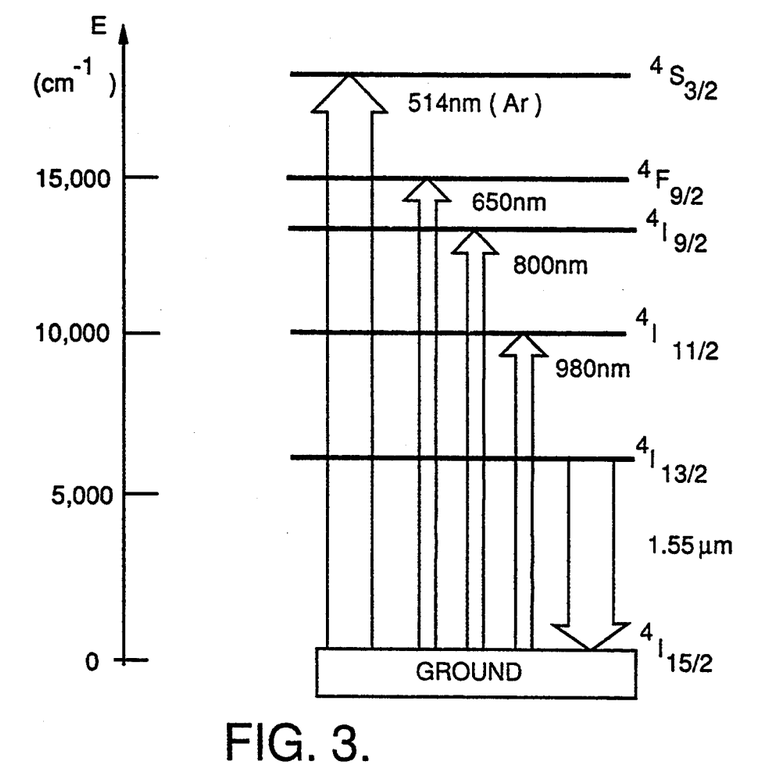
FIG. 3 is an energy diagram showing the energy levels of erbium.

The energy levels of erbium ions doped in glass hosts is shown in FIG. 3. Its ionic response to pump beams at various wavelengths is indicated by arrows extending upward from the $^4I_{15/2}$ energy level, which may be taken as a ground state. Optical radiation at 0.98 microns induces a transition from the ground state to the excited state $^4I_{11/12}$. Electrons rapidly decay from this state via phonon emission to the metastable state $^4I_{13/2}$. From this excited state the electrons fall to the ground state, stimulating an emission at 1.55 microns in the process.

Figure 4:
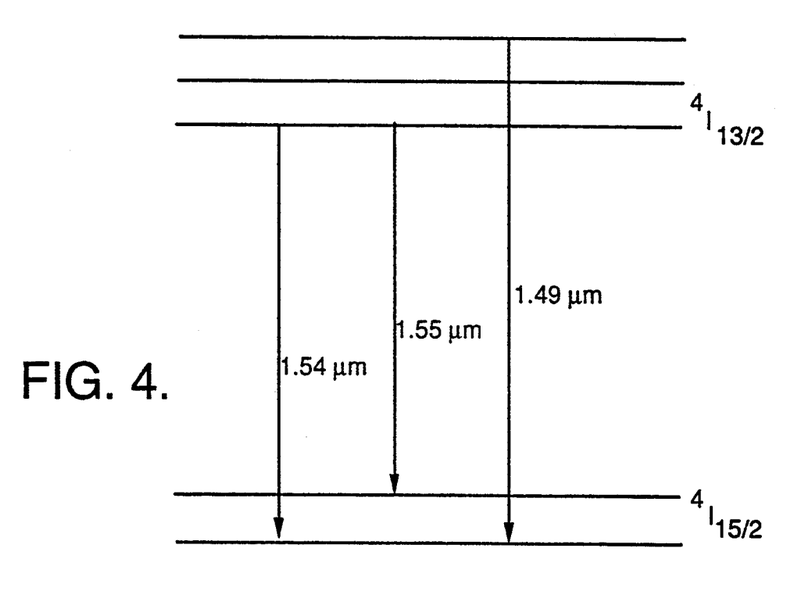
FIG. 4 is an energy diagram showing energy transitions for erbium between the $^4I_{13/2}$ and the $^4I_{15/2}$ energy states that are involved in radiating at 1.55 microns.

A detailed fine structure of the stimulated emission transition is shown in FIG. 4, which displays the three possible excited states corresponding to $^4I_{13/2}$ and the two states corresponding to ground level $^4I_{15/2}$. Depending upon the beginning and terminating energy states, there are three possible emission wavelengths at 1.49, 1.54 and 1.55 microns. The selection of the particular output emission wavelength is determined by the input source, which in the described illustration is the 1.55 micron laser 4.

It is desirable that the system be capable of transferring relatively large amounts of energy from the pump beam to the working beam. Erbium doped fiber amplifiers have been demonstrated to have high gain on the order of 30 dB in the 1.5 micron region, Mears et al., supra. They are also capable of achieving a high modulation rate in the ten GHz regime.

In general, it is also desirable that the frequency response of the resonant amplifying medium 22 be fairly wide, permitting the application of a correspondingly wide frequency modulation by acousto-optical modulator 18. Barium titanate, for example, has an undesirably narrow response bandwidth of only about 1 Hz at 1 W/cm$^2$. This means that the probe beam would have to be locked to within 1 Hz of the amplified working beam input to the resonant energy transfer medium 22. Such a tight frequency matching is very difficult to achieve in practice. With an erbium doped glass or crystal medium, by contrast, frequency modulations in the MHz to hundreds of GHz regime are achievable, permitting the system described herein to be used for communications applications.

Figure 5:
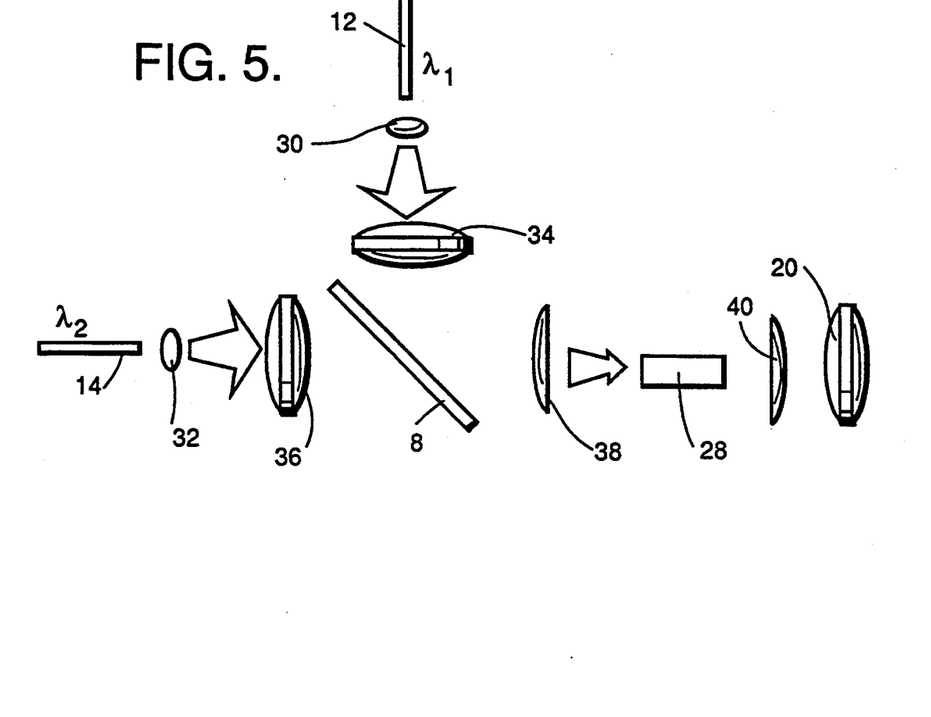
FIG. 5 is a schematic diagram of the portion of the invention that transfers energy between optical beams of two different wavelengths for an embodiment that employs a waveguide energy transfer medium.

Various structures may be used to couple the input pump and working beams into an energy transfer medium. A suitable system for use with the doped slab waveguide 28 of FIG. 2 is illustrated in FIG. 5. The pump beam 12 and working beam 14 are processed through expanding lenses 30, 32 and collimating lenses 34, 36 respectively. The two beams are then directed onto a cylindrical focusing lens 38 by the beam splitter 8 (after diversion of a portion of the working beam for use as the probe beam), which focuses the combined beams into the slab waveguide 28. The waveguide output is expanded by another cylindrical lens 40 and then focused by lens 20 into the resonant energy transfer crystal (not shown).

Figure 6:
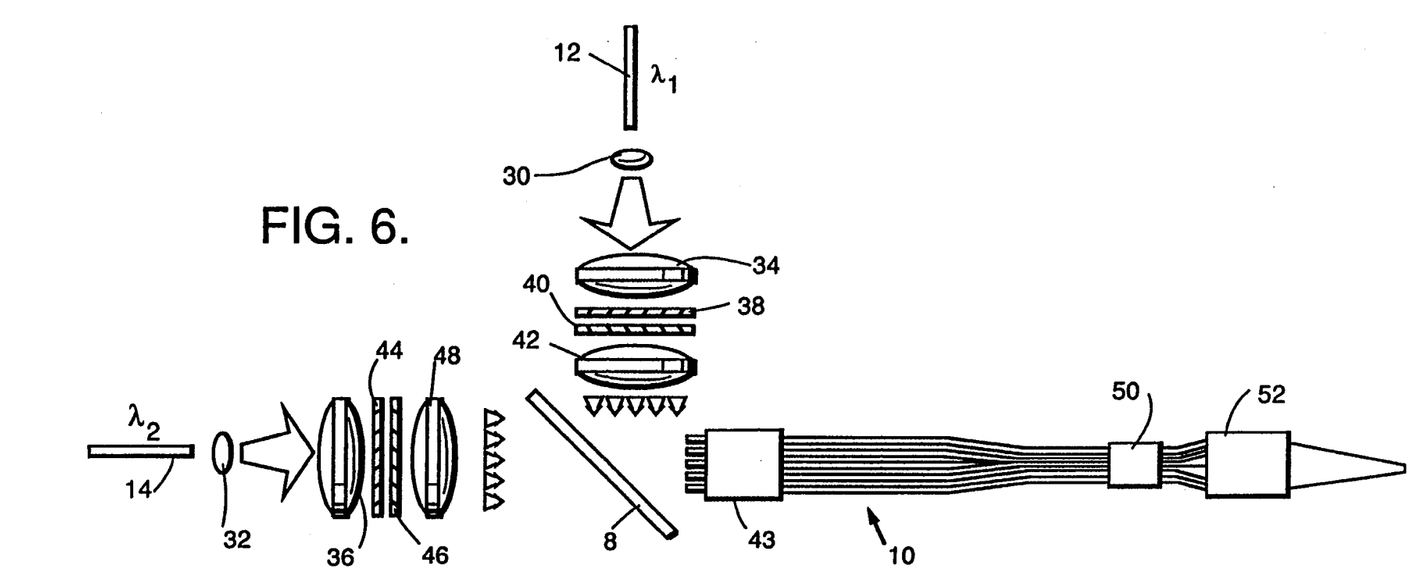
FIG. 6 is a schematic diagram of the portion of the invention that transfers energy between optical beams of different wavelengths for an embodiment that employs a multiple fiber energy transfer medium with a binary phase grating input.

FIG. 6 shows an optical coupling scheme that can be used when a matrix of optical fibers is employed as the energy transfer medium between the pump and working beams. The same reference numerals are used for elements that are common with those of previous figures. This technique employs optical phase gratings to divide the input beams into separate beam segments that are coupled into respective fibers. A binary phase grating divides a beam into a line of subbeams. To accommodate an m×m array of optical fibers, a first binary phase grating 38 is positioned optically downstream from collimating lens 34 for the pump beam 12 to produce a line of m (m=5 in the example of FIG. 6) separate subbeams. A second binary phase grating 40 is mounted on the same axis but rotated 90° to the first grating 38, thus dividing the line of m subbeams from the first grating into an m×m array. This array of beams is focused onto the input ends of the array of optical fibers 10 via a focusing lens 42 and the beam splitter 8, with the input ends of the fibers held in place with a silicon v-groove assembly 43. A similar pair of mutually orthogonal binary phase gratings 44, 46 are positioned optically downstream from the collimating lens 36 for the working beam 14, and divide the working beam into an m×m array that is focused by lens 48 and superimposed into the m×m pump beam array at the fiber inputs.

The input ends of the fibers 10 are preferably increased in diameter and slightly ball lensed to increase the coupling efficiency of the input beams, and to allow for slight off-axis mismatches in the converging beam arrays. The output ends of the fibers are held in another silicon v-groove array 50. A self-focusing gradient index lens 52 receives the optical outputs from the fibers 10 and focuses them onto the resonant energy transfer crystal (not shown).

The fiber cores at their output ends should be as close together as possible so that lens 52 focuses all the array output at a single point in space or in the resonant energy transfer crystal. For this purpose the fibers' outer cladding preferably etched down near their output ends to allow the fiber cores to be positioned closer together. The fiber end faces preferably extend beyond the v-groove array 50 so that minor adjustments of the fiber positions may be made to ensure that all of the fiber images are at the same point in the focal plane. A pitch 0.11 or 0.23 is preferable for the self-focusing lens 52 so that no light is focused internally.

Figure 7:
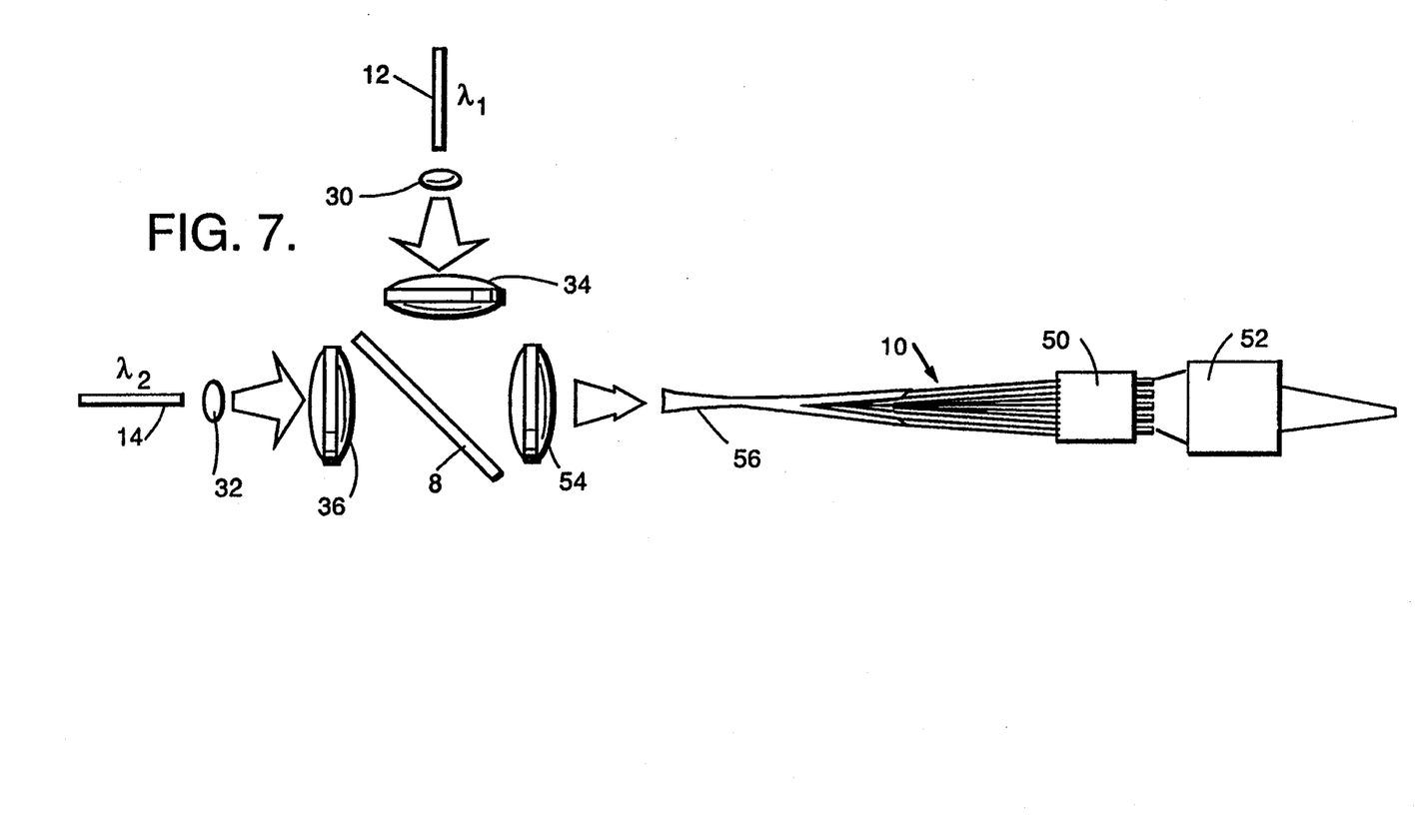
FIG. 7 is a schematic diagram of the portion of the invention that transfers energy between beams of different wavelengths for an embodiment that employs a multiple fiber transfer medium and an input coupling fiber.

An alternate technique for coupling the pump and working beams into a fiber matrix is illustrated in FIGS. 7. In this embodiment the pump and working beams are again processed through their respective expanding and collimating lenses 30, 34 and 32, 36 from there they are directed by beam splitter 8 into another lens 54 that focuses that superimposed beams onto the input end of an optical fiber that is preferably single mode with respect to the working beam 14, and couples the two beams into the array of fibers 10. The amplifying fibers 10 are joined at their input ends to the coupling fiber 56.

Figure 8:
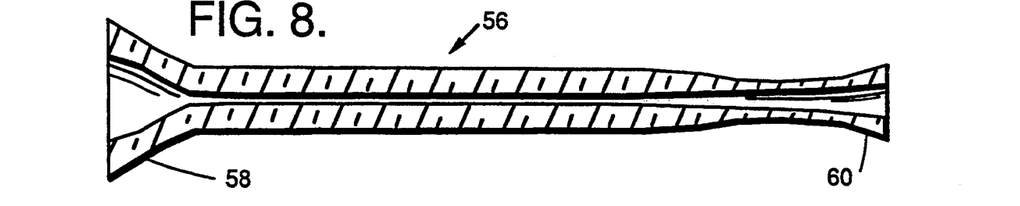
FIG. 8 is a sectional view of the input coupling fiber used in the embodiment of FIG. 7.

A sectional view of a preferred coupling fiber configuration is provided in FIG. 8. The coupling fiber's input end 58 is preferably "uptapered" (increased in area). Its output end 60 is also uptapered, but not as much as its input end. The coupling fiber 56 is doped with a rare earth material in a manner similar to the amplifying fibers 10. Its input end is also slightly rounded from fire polishing in its fabrication. In addition to being somewhat uptapered, the fiber's output end 60 also has a significant amount of the cladding etched away. Together with the uptaper, this appears to produce a better coupler in the sense that the fiber-to-fiber uniformity is improved over simply splicing a straight single mode fiber to the coupler.

Figure 9A:
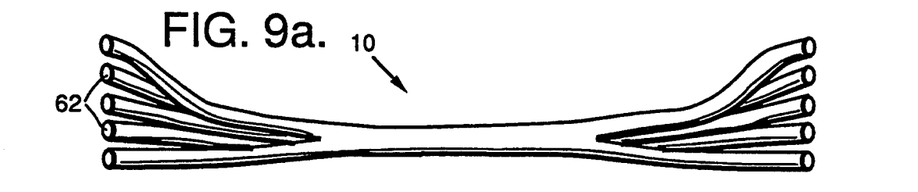
FIG. 9a, 9b and 9c are elevation views illustrating alternate fabrication techniques for the multiple fibers of FIG. 7.
Figure 9B:
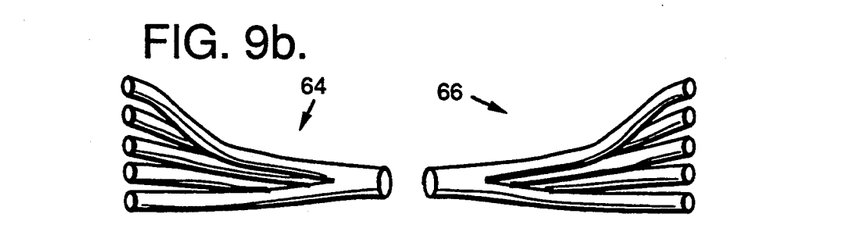
Figure 9C:
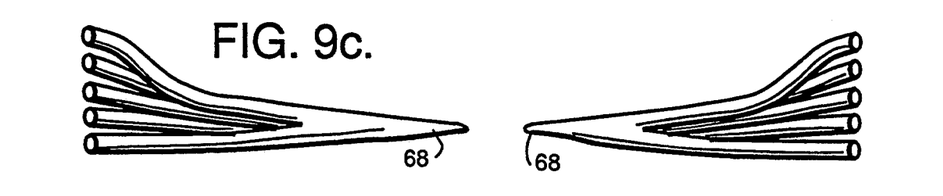

FIGS. 9a-9c illustrate two possible fabrication techniques for the amplifying array of fibers 10. In FIG. 9a an array of separate rare earth doped fibers 62 are brought together and heated at their midsections to fuse them together with a "twist and pull" motion applied to the opposite ends of the fibers. This leaves a set of separate fibers at each end, with the central portion fused together. The central portion can then be cleaved to yield two separate fiber arrays 64, 66 that are merged at one end and separate at their opposite ends, as illustrated in FIG. 9b. Alternately, during the "twist and pull" operation the opposite ends of the fiber array may be pulled apart while the separate fibers are fused together, as illustrated in FIG. 9c. The latter approach produces a pair of fiber arrays with tapered merged input sections 68.

Figure 10:
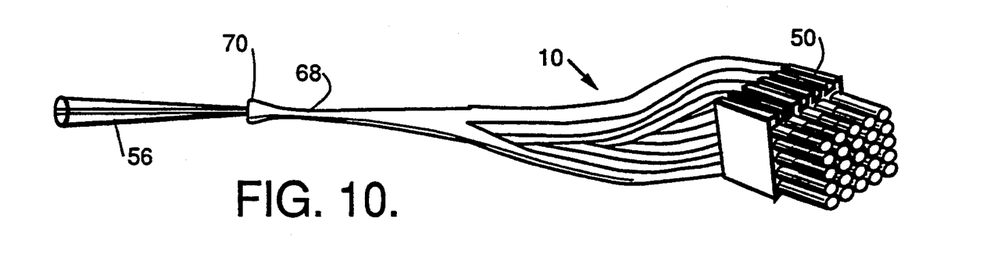
FIG. 10 is a perspective view illustrating the joinder of the input coupling fiber to the multiple energy transfer fibers of FIG. 7.

The fabrication technique of FIG. 9b is preferable in the sense that the pump and working beams can be focused directly onto the cleaved face of the fiber matrix, with the merged input end of the matrix functioning as the coupling fiber 56. This decreases the nonlinear effects of high energy densities in the smaller coupling region countered with the fabrication technique of FIG. 9c. However, a good cleave is somewhat difficult to achieve, and one or more of the fibers may break off from the pack during the cleaving process. The technique of FIG. 9c, on the other hand, involves no critical cleaving steps; the fiber pack is heated in a splicer and the small tapered end 68 is fused to an input coupling fiber such as that shown in FIG. 8. The completed array of optical fibers and input coupling fiber, joined by a splice 70, is shown in FIG. 10.

Figure 11:
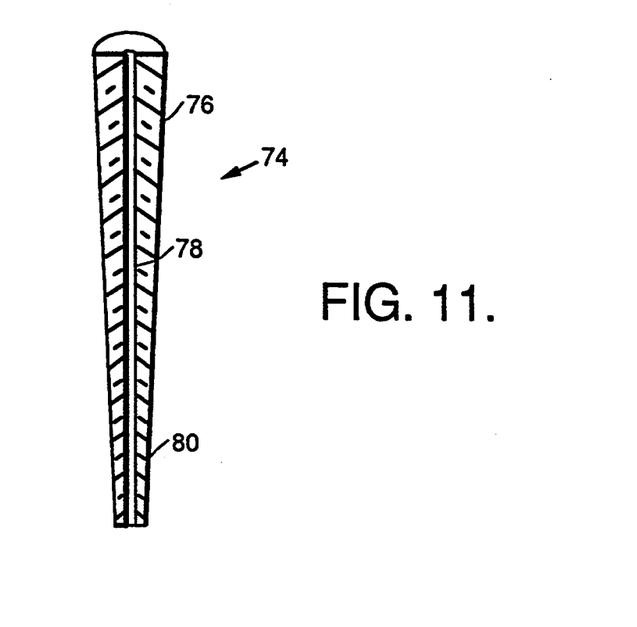
FIG. 11 is a sectional view of an energy transfer fiber employed in the embodiments of FIGS. 6 and 7.

A preferred geometry for the separate fibers in the array 10 is illustrated in FIG. 11. The input end 72 of each fiber 74 can have a standard dimension, such as an outside diameter of 125 microns for the cladding layer 76. The optical guiding core 78 surrounded by the cladding layer has a diameter that is selected to be single mode for the working beam wavelength; this is about 10 microns for a working beam wavelength of 1.55 microns. The cladding layer at the fiber's output end 80 is etched down to a smaller outside diameter, such as 25-30 microns, to permit a higher packing density in the v-groove array 50.

Figure 12:
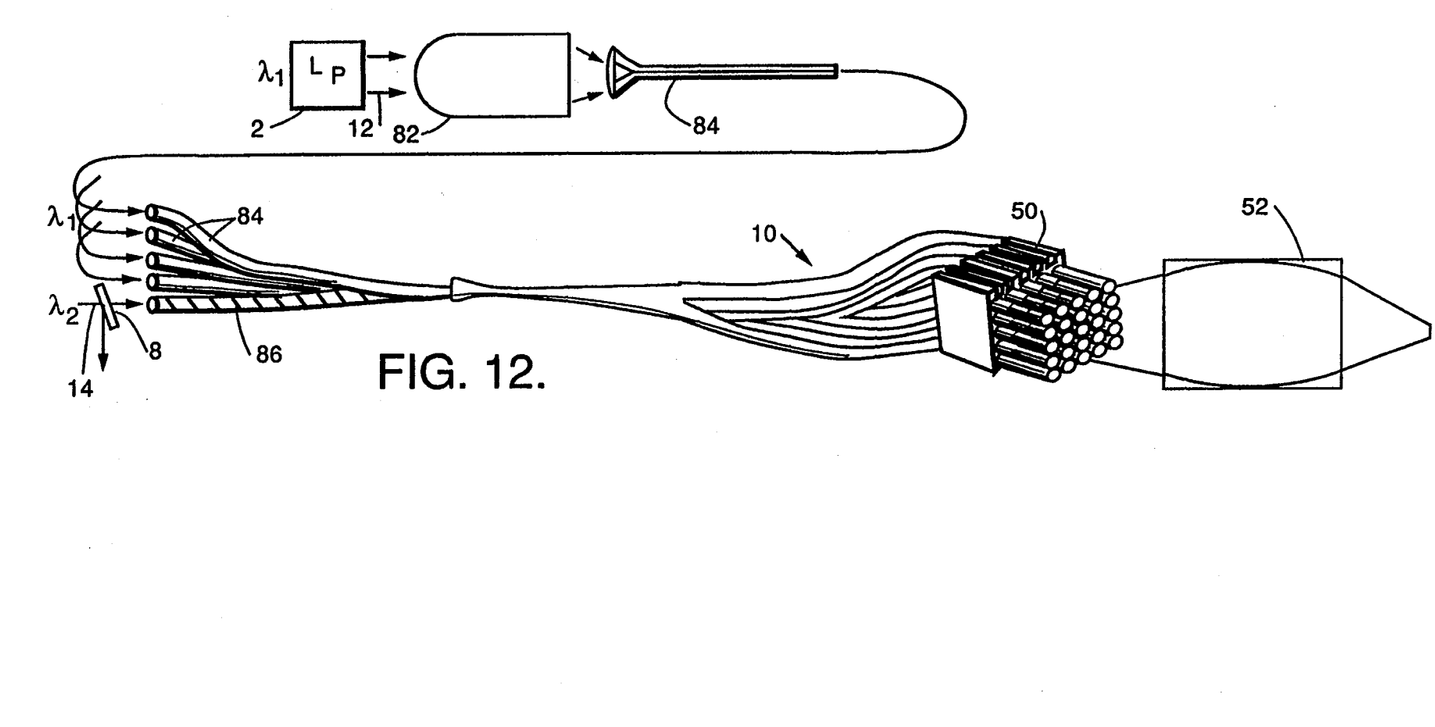
FIG. 12 is a perspective view of another embodiment of the invention in which respective single mode input coupling fibers to a multiple fiber energy transfer medium are provided for the pump and working beams.

Another embodiment of the invention in which the pump and working beams are not overlapped until they are introduced into the amplifying fiber pack is illustrated in FIG. 12. The embodiment shown employs an amplifying fiber array such as that of FIG. 10. The pump beam 12 emitted from the pump laser 2 is focused by a gradient index self-focusing lens 82 onto the input ends of a plurality of coupling optical fibers 84 that are single mode with respect to the pump beam. As with lens 52 in the other figures, a gradient index self-focusing lens is preferred for element 82 because it is capable of focusing an input beam down to a small point. However, other types of lenses might also be used. The pump beam 12 is distributed among a plurality of input coupling fibers 84 because of its high power level. Each of the coupling fibers 84 is preferably terminated at its input end with an uptaper and ball lens surface.

The relatively low power working beam 14 is similarly coupled into a coupling fiber 86 that is single mode with respect to the working beam. Only a single coupling fiber 86 is normally needed for the working beam because of its lower power, although this beam if desired can also be divided into more than one coupling fibers that would still be fewer in number than the coupling fibers 84 employed for the pump beam. All of the coupling fibers 84 and 86 are fused together by a "twist and pull" technique while heated, and are then spliced to the fused input end of the amplifying fiber array 10.

All of the above embodiments avoid the problem of thermal loading, since no injection current is present in the amplifier, as well as inherent problems associated with the use of photorefractive materials in prior phase conjugation and two-beam coupling geometries. They enjoy a high speed response and can be used with either continuous wave or pulsed inputs. The diffraction limited quality of the original probe beam is also maintained during its modulation and subsequent resonant energy transfer from the amplified working beam.

The power efficiency of a high power semiconductor laser system using an erbium doped fiber amplifier array can be estimated as follows. Assume that the optical power required at the input of the two-wave mixing crystal 22 is 1 W, and that the saturated output power of each erbium dope fiber amplifier is 20 mW. About 50 fiber amplifiers will thus be required. Each amplifier is pumped by a 0.98 micron laser that is driven by a 300 mA current source at 2 volts. The estimated pump power in each amplifier is 60 mW. Based upon these figures, the total electrical power needed to drive the 0.98 micron lasers is $2 \times 0.3 \times 50 = 30$ W. The 0.98 micron lasers will also generally require temperature stabilization that can add an additional energy requirement of about 10 W to the system.

The desired 1.55 micron master oscillator laser power to feed each fiber amplifier is about 0.2 mW. A single mode, single frequency laser of at least 30 mW is thus required, allowing for coupling losses of 5 dB. The electrical power needed to drive this laser and any other stabilization circuit will be about 2 W. The total electrical power needed to operate the high power laser system will thus be on the order of 45 W. The useful coherent output 1.55 microns is just under 1 W, for an overall power efficiency of about 2 percent.

The efficiency of the two-beam resonant coupling process in the crystal 22 also comes into play. The optimum two-beam coupling efficiency is 100 percent, assuming that all the energy from the amplified working beam is transferred to the weak probe beam. This goal may not be totally realizable in practice due to inherent losses in the crystal through scattering from defects and impurities.

While several illustrative embodiments of the invention have been shown and described, numerous variations and alternate embodiments will occur to those skilled in the art. Such variation and alternate embodiments are contemplated, and can be made without departing from the spirit and scope of the invention as defined in the appended claims.

We claim:

1. An optical energy transfer system, comprising:
   means for producing a first coherent optical beam having a first predetermined wavelength and frequency,
   means for producing a coherent pump optical beam having a predetermined wavelength and frequency which are different from the wavelength and frequency of said first beam,
   means for diverting a portion of said first beam to establish a probe beam having the predetermined frequency of said first beam, with the remaining portion of said first beam undiverted,
   means for modulating the frequency of said probe beam,
   a first host medium having a rare earth dopant, said rare earth dopant having an energy transition from said pump beam's wavelength to the wavelength of said first beam,
   first coupling means for coupling said pump beam and the undiverted portion of said first beam into said first host medium, said pump beam amplifying said first beam within said host medium by an energy transfer from said pump beam to said first beam via the energy transition of said rare earth dopant,
   a second host medium having a rare earth dopant, said second host medium and its rare earth dopant providing a resonant energy transfer medium between, and being located in the paths of, said amplified first beam and said modulated probe beam, and
   second coupling means for coupling said amplified first beam and said modulated probe beam into said second host medium for amplification of said modulated probe beam by a resonant energy transfer from said amplified first beam to said modulated probe beam.

2. The optical energy transfer system of claim 1, wherein said modulated probe beam is substantially diffraction limited and said amplified first beam is substantially non-diffraction limited when they are coupled into said second host medium.

3. The optical energy transfer system of claim 1, wherein said pump beam producing means produces said pump beam at a substantially higher power level than said first beam producing means produces said first beam.

4. The optical energy transfer system of claim 3, wherein the wavelengths of said first and pump beams are respectively about 1.55 and 0.98 microns, and said first host medium is doped with erbium.

5. The optical energy transfer system of claim 1, said modulating means comprising means for frequency modulating said probe beam to establish a resonant energy transfer interference pattern between said modulated probe and amplified first beams within said second host medium.

6. The optical energy transfer system of claim 5, said second host medium having a predetermined optical energy transfer response bandwidth, wherein the bandwidth of said frequency modulating means is less than the optical energy transfer response bandwidth of said second host medium.

7. The optical energy transfer system of claim 5, wherein said modulating means has a modulating frequency substantially greater than 100 KHz.

8. The optical energy transfer system of claim 5, said modulating means comprising an acousto-optic modulator.

9. The optical energy transfer system of claim 1, said first host medium comprising a plurality of optical fibers disposed to receive an input from said first coupling means at one end and to provide an output to said second coupling means at their opposite ends.

10. The optical energy transfer system of claim 9, wherein the input ends of said optical fibers are arranged in an $m \times m$ array, and said first coupling means comprises a pair of $1 \times m$ mutually orthogonal binary phase gratings oriented to divide said first and pump beams into an m×m array aligned with the input ends of said optical fibers, and means for combining said first and pump beams.

11. The optical energy transfer system of claim 10, wherein separate pairs of mutually orthogonal binary phase gratings are provided to divide said first and pump beams into respective m×m arrays, and said beam combining means combines said m×m first and pump beam arrays.

12. The optical energy transfer system of claim 9, said fibers having cladded cores with predetermined core areas, wherein the areas of said cores are expanded at the input ends of said fibers.

13. The optical energy transfer system of claim 9, said fibers comprising cores surrounded by cladding layers, wherein the thickness of said cladding layers is reduced at the output ends of said fibers, and further comprising means holding the output ends of said fibers in close proximity to each other.

14. The optical energy transfer system of claim 9, wherein said fibers are joined to each other at their input ends, and separated in a spaced array at their output ends.

15. The optical energy transfer system of claim 14, said first coupling means focusing said first and pump beams directly onto the input ends of said fibers.

16. The optical energy transfer system of claim 14, wherein the areas of said fibers are reduced at their input ends, and said first coupling means includes a coupling optical fiber that is single mode with respect to said first beam, said coupling fiber having an input end that is enlarged with respect to the input ends of said host medium fibers and an output end positioned to illuminate the input ends of said host medium fibers, and means for focusing said first and pump beams onto the input end of said coupling fiber.

17. The optical energy transfer system of claim 16, wherein the output end of said coupling fiber is enlarged with respect to the portion of the coupling fiber between its input and output ends.

18. The optical energy transfer system of claim 14, wherein the areas of said fibers are reduced at their input ends and said first coupling means includes a plurality of single-mode optical coupling fibers having output ends positioned to illuminate said host medium fibers and input ends, and means for focusing said first beam onto the input end of at least one of said coupling fibers and said pump beam onto the input ends of a greater number of coupling fibers than those that receive said first beam.

19. The optical energy transfer system of claim 1, said first host medium comprising an optical waveguide.

20. The optical energy transfer system of claim 1, said means for generating said first and pump beams comprising respective optical lasers.

21. An optical energy transfer system, comprising:
first and second sources of coherent first and coherent pump optical beams at different respective wavelengths and frequencies,
means for diverting a portion of said first beam into a probe beam having the same frequency as first beam,
means for modulating the frequency of said probe beam,
means for transferring energy from said pump beam to said first beam after diversion of said probe beam, thereby amplifying said first beam,
a rare earth doped resonant transfer host medium that provides a resonant energy transfer medium between, and is located in the paths of, said amplified first beam and said modulated probe beam, and
means for coupling said frequency modulated probe beam and amplified first beam within said resonant transfer host medium so that they beat against each other and generate interference gratings as a result of frequency differences between the frequency modulated probe and amplified first beams, said gratings producing a coherent scattering of the amplified first beam that effects a resonant energy transfer from said amplified first beam to said probe beam.

22. The optical energy transfer system of claim 21, wherein said first beam source generates said first beam and probe beam as substantially diffraction limited beams, said energy transfer means causes said amplified first beam to be substantially non-diffraction-limited, and said resonant transfer host medium substantially preserves the diffraction limited quality of said probe beam during said energy transfer thereto.

23. The optical energy transfer system of claim 21, wherein said first and second optical beam sources generate said first and pump beams at about 1.55 microns and 0.98 microns, respectively.

24. The optical energy transfer system of claim 21, said energy transfer means comprising a first host medium having a rare earth dopant with an energy transition from the wavelength of said pump beam to the wavelength of said first beam, and means for coupling said first and pump beams into said first host medium.

25. An optical fiber array, comprising:
a plurality of elongate optical fibers having respective optical cores surrounded by cladding layers,
the thickness of the cladding layer for each of the fibers being reduced in the vicinity of one end of the fibers, and
means holding said reduced thickness ends of the fibers in close proximity to each other.

26. The optical fiber array of claim 25, wherein the opposite ends of said fibers from said reduced thickness ends are joined together in a common optical fiber.

27. A diffraction limited method of transferring energy from a coherent optical pump beam at one wavelength to a first optical beam at another wavelength, comprising:
generating said first beam as a substantially diffraction limited coherent beam,
diverting a portion of said first beam as a substantially diffraction limited coherent probe beam,
transferring energy from said pump beam to said first beam after diversion of said probe beam to yield a substantially non-diffraction limited amplified first beam, and
transferring energy from said amplified first beam to said probe beam in a substantially diffraction-limited energy transfer process to yield a substantially diffraction limited amplified probe beam at said first beam wavelength.

28. The method of claim 27, wherein energy is transferred from said pump beam to said first beam by transmitting said beams through a host medium having a rare earth dopant with an energy transition from the wavelength of said pump beam to the wavelength of said first beam.

29. The method of claim 27, wherein energy is transferred from said amplified first beam to said probe beam by frequency modulating said probe beam, and beating said frequency modulated probe beam against said amplified first beam in a host medium having a rare earth dopant to generate optical gratings in said medium that scatter said amplified first beam to effect a resonant energy transfer between said beams.

* * * * *